United States Patent [19]

De brey

[11] Patent Number: 4,641,391

[45] Date of Patent: Feb. 10, 1987

[54] COMPACT DIGITAL DISC CLEANER APPARATUS

[75] Inventor: Robert J. De brey, Edina, Minn.

[73] Assignee: Geneva Group of Companies, Inc., Eden Prairie, Minn.

[21] Appl. No.: 814,977

[22] Filed: Dec. 31, 1985

[51] Int. Cl.[4] .............................................. G11B 3/58
[52] U.S. Cl. .................................. 15/104.94; 15/118; 15/210 R; 15/268
[58] Field of Search ................ 15/268, 209 R, 104.93, 15/104.94, 210 R, 118

[56] References Cited

U.S. PATENT DOCUMENTS

| 3,082,468 | 3/1963 | Wattles | 15/104.94 |
|---|---|---|---|
| 4,053,242 | 10/1977 | Mast | 15/104.94 X |
| 4,194,464 | 3/1980 | Dye et al. | 15/268 X |
| 4,569,098 | 2/1986 | Kawabe | 15/268 X |
| 4,574,418 | 3/1986 | Yamaguchi | 15/268 |

FOREIGN PATENT DOCUMENTS 1552213  9/1979  United Kingdom .................. 15/268

OTHER PUBLICATIONS

Brochure A is published by Discwasher, 1407 N. Providence Rd. Columbia, Mo. 65205, 1985.
Brochure B is an article entitled "Laser Fare"; AudioVideo International.
Brochure C is an article entitled "Compact Discs: On the Charts, with a Bullet"; Marketing & Media Decisions, Mar. 1985.
Brochure D is an article written by John Sippel entitled "CD Finds Warm Welcome at Video Outlets"; Jan. 25, 1986.
Brochure E is a Dealer Price Schedule for Allsop; Jan. 1, 1986.
Advertisement; Bib Audio/Video Products Limited; P.O. Box 27682, Denver, Colo. 80227; Jan. 1986.
Advertisement; Discwasher; The Accessories Company; 1985.
Advertisement; Jook-Box Corporation; 4525 Alger Street, Los Angeles, Calif. 90039.
Advertisement; Recoton Corp. 46-23 Crane Street, L.I.C., N.Y. 11101; 1985.
Advertisement; Discwallet, Dept. SR, Box 444, Sta. Z, Toronto, Ontario M5N 2Z5; Stereo Review, Apr. 1986.
Advertisment; Allsop, P.O. Box 23, Bellingham, Wash. 98227; Video Product News: Sep./Oct., 1984.
Advertisment; Allsop, P.O. Box 23, Bellingham, Wash. 98227; Retailer News; Oct. 1984.
Advertisement; Bib Audio Video Products, 3595 S. Teller, Suite 402, M. Lakewood, Colo. 80235; Merchandising, Feb. 1985.
Advertisement; Discwasher; Sound and Vision, Aug. 1985.
Advertisement; Koss; 1985 Winter CES.
Advertisement; Kyowa Sonic Co., Ltd., 146-1 Gotemba, Gotemba-shi, Japan; Audio/Video International; Jun. 1985.
Advertisement; Koss Corp., 4129 North Port Washington Ave., Milwaukee, Wis. 53212; Audio Times; Aug. 1985.
Advertisement; Market News: Jan. 1986.
Advertisement; Recoton Corporation; 46-23 Crane Street, Long Island City, N.Y. 11101; Consumer Electronics; Jun. 1985.
Advertisement; Recoton, 46-23 Crane Street, Long Island City, N.Y. 11101; Audio Retailer, May 1986.
Advertisement; Recoton, 46-23 Crane Street, Long Island City, N.Y. 11101; Audio, Mar. 1986.
Advertisement; Allsop, Inc. P.O. Box 23, Bellingham, Wash. 98227; Hi Fidelity; May 1985.

Primary Examiner—Chris K. Moore
Attorney, Agent, or Firm—Merchant, Gould, Smith, Edell, Welter & Schmidt

[57] ABSTRACT

A compact digital disc cleaner apparatus (20) including a housing (22) having a top surface (24) with a pedestal portion (30) for receipt of a compact digital disc (32) and a bottom surface (26) having a plurality of receptacles (40) positioned thereon and configured for removably receiving corresponding cleaning pad assemblies (42).

16 Claims, 7 Drawing Figures

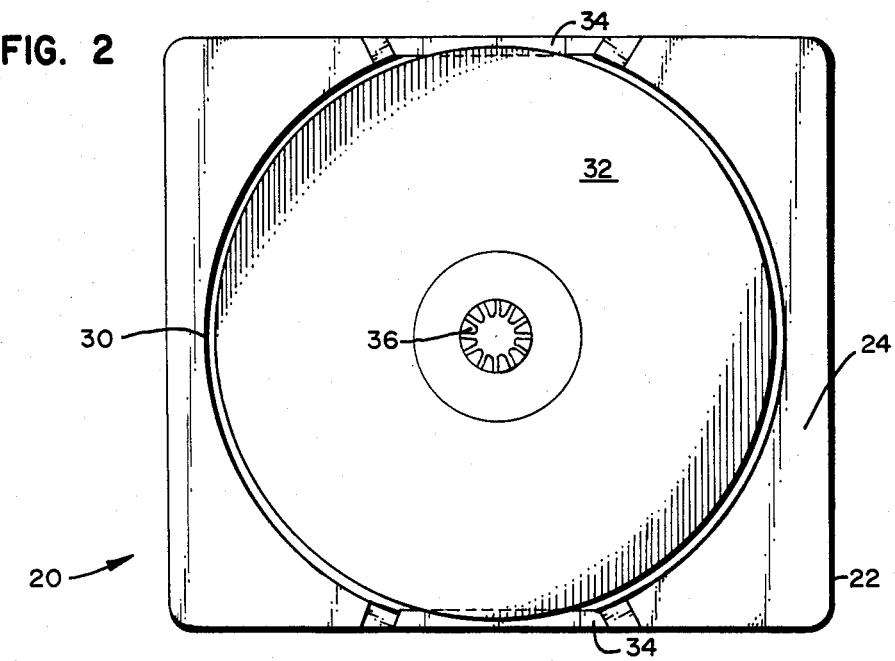
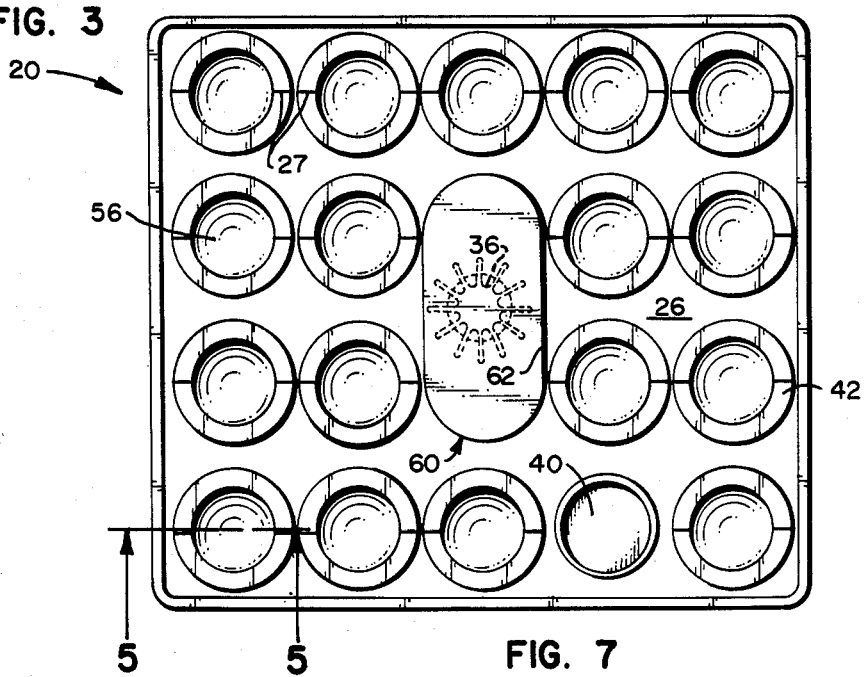
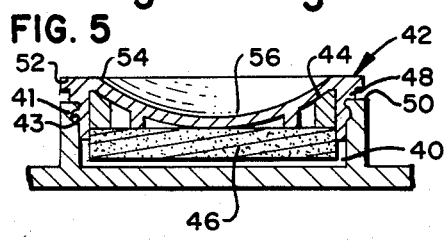
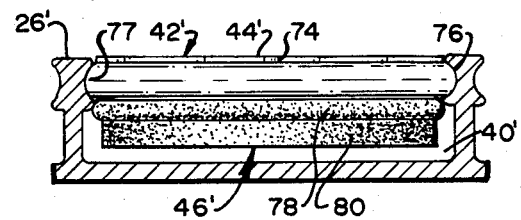

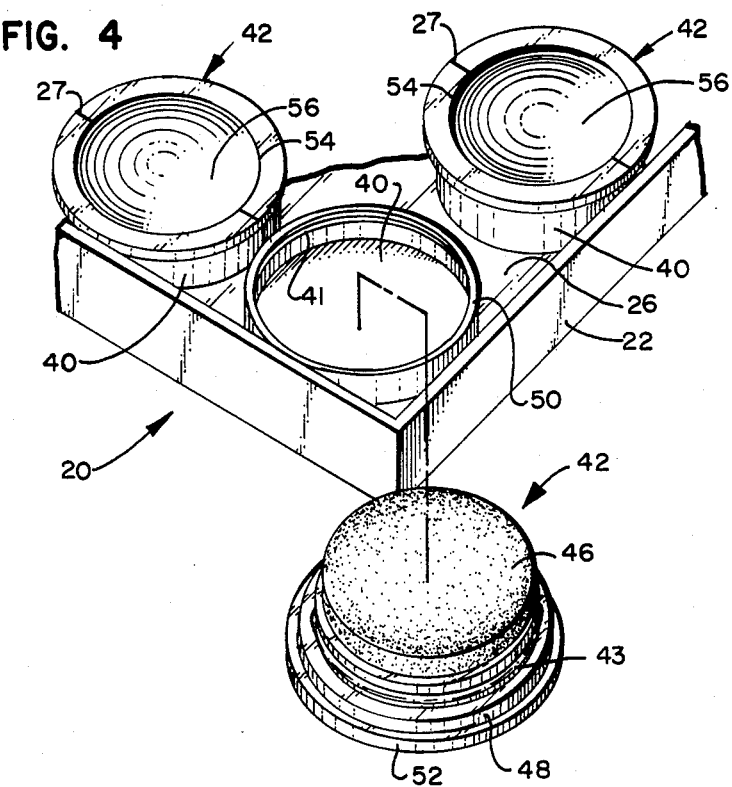

COMPACT DIGITAL DISC CLEANER APPARATUS

BACKGROUND OF THE INVENTION

This invention relates to a cleaner apparatus, and more particularly, to a compact digital disc (CD) cleaner apparatus.

SUMMARY OF THE INVENTION

The present invention relates to a compact digital disc cleaner apparatus for cleaning compact digital discs. The compact digital disc cleaner apparatus includes a housing having first (top) and second (bottom) oppositely facing sides. The first side of the housing includes pedestal means for positioning thereon a compact digital disc. The pedestal means defines circular recess means for receipt of the compact digital disc and second recess means interconnecting the circular recess means with an outer edge of the housing whereby the compact digital disc can be grasped when positioned in the circular recess means. The second side of the housing includes a plurality of receptacle means, each configured for receipt of wetted cleaning pad assembly means. Each cleaning pad assembly means includes a handle member and a wetted cleaning pad. The cleaning pad assembly means forms a substantially air-tight seal with its corresponding receptacle means when the cleaning pad assembly means is inserted therein, whereby the cleaning pad does not dry out for an extended period of time.

In the preferred embodiment of the present invention, the housing is substantially the same size as that of a conventional compact digital disc case, having substantially dimensions of roughly 5 and $\frac{3}{8}''\times 4$ and $29/32''\times 13/32''$. The present invention might be made from any number and types of materials; for example, moldable plastic material.

In the preferred embodiment of the present invention, the receptacle means are cylindrical in nature, as are the cleaning pad assembly means, the receptacle means and the cleaning pad assembly means including cooperating tongue and groove means forming a substantially air-tight fit when the cleaning pad assembly means is inserted into the receptacle means.

In the preferred embodiment, the handle member of the cleaning pad assembly means preferably includes a rim portion which is raised above the second surface of the housing when the cleaning pad assembly means is inserted into the receptacle means, whereby the rim portion can be grasped to enable removal of the cleaning pad assembly means from the receptacle means.

In the preferred embodiment, the circular recess means of the first side of the housing includes a central hub portion similar to that found in a conventional CD case.

In one embodiment, the cleaning pad assembly means has an absorbent, non-abrasive cleaning pad which has a diameter roughly one-half of the media width as measured from an outer edge of the media to an inner edge proximate the hub of the compact digital disc.

Yet another feature of the preferred embodiment of the present invention is the inclusion of brush assembly means removably mounted on the second side of the housing for burnishing a surface of the compact digital disc during the cleaning process. The brush assembly means might also be used before cleaning to wipe off dust or other foreign material before beginning the cleaning process.

A particularly advantageous feature of the preferred embodiment of the present invention which is configured like that of a conventional compact digital disc case, is that the compact digital disc cleaner apparatus of the present invention can be stored in a storage device meant for storage of compact digital disc cases. Accordingly, a separate storage area for the compact digital disc cleaner apparatus is not required.

The present invention provides a compact digital disc cleaner apparatus which is inexpensive to mold, a preferred embodiment having a housing made from an integral molding process as a one piece unit, is easy to use and is of rugged structure.

Yet another advantage of the present invention is that it not only provides a plurality of cleaning pads for cleaning of the surfaces of a compact digital disc, but it further provides a convenient structure for holding compact digital discs during the cleaning process.

Moreover, the present invention provides for a plurality of cleaning pad assemblies such that a fresh, uncontaminated cleaning pad assembly can be used each time compact digital discs are cleaned.

In an alternate embodiment of the present invention, indicia means or structural means is provided so as to indicate when a cleaning pad has been used. In one embodiment, an alignment pattern is provided on the cleaning pad assembly means so as to indicate alighment, the cleaning pad assembly means being aligned in rows and columns. In another embodiment, the cleaning pad assembly might include a flip up handle member which is color-coded so as to indicate when its associated cleaning pad has been used.

These and various other advantages and features of novelty which characterize the present invention are pointed out with particularity in the claims annexed hereto and forming a part hereof. However, for a better understanding of the invention, its advantages and objects attained by its use, reference should be had to the drawings, which form a further part hereof, and to the accompanying descriptive matter, in which there is illustrated and described a preferred embodiment of the invention.

BRIEF DESCRIPTION OF THE DRAWINGS

In the drawings, in which like reference numerals and letters indicate corresponding parts throughout the several views:

FIG. 2 is a plan view of a top surface of the embodiment shown in FIG. 1;

FIG. 3 is a plan view of a bottom surface of the embodiment shown in FIG. 1;

FIG. 4 is an enlarged partial perspective view of the bottom surface illustrating a cleaning pad assembly removed from its associated receptacle;

FIG. 5 is a cross-sectional view of a cleaning pad assembly of the embodiment shown in FIG. 1;

FIG. 7 is a partial, cross-sectional view of the embodiment shown in FIG. 6.

DETAILED DESCRIPTION OF THE PREFERRED EMBODIMENT

Figure 1:
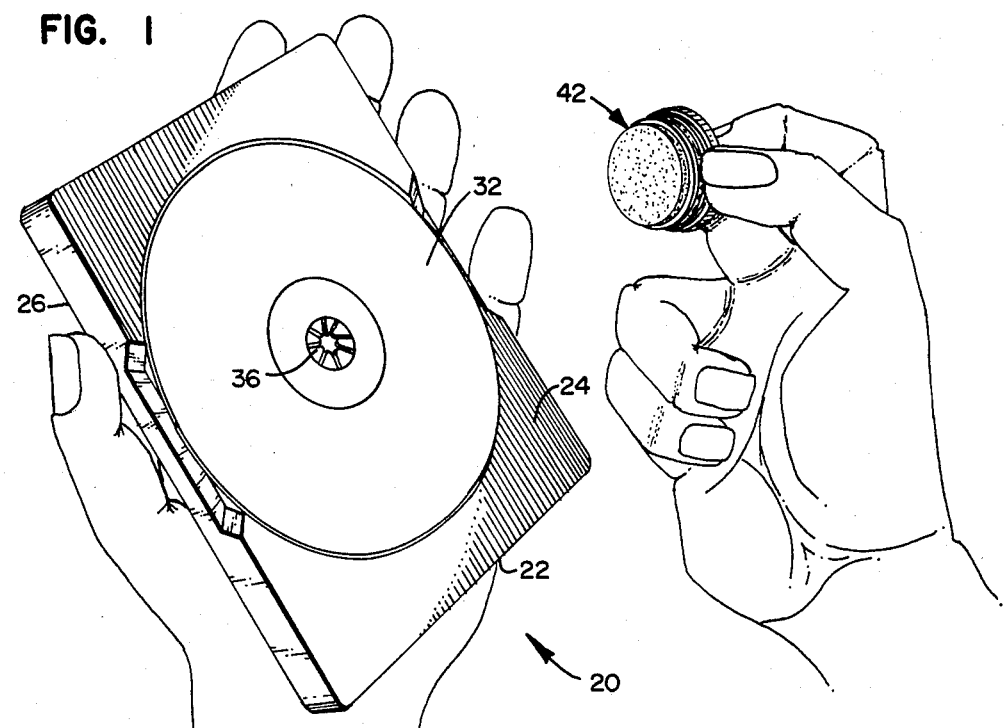
FIG. 1 is a view in perspective of an embodiment of a compact digital disc (CD) cleaner apparatus in accordance with the principles of the present invention during actual use.

Referring now to the drawings, there is illustrated in FIGS. 1 through 5 a preferred embodiment of a compact digital disc (CD) cleaner apparatus in accordance with the principles of the present invention, the compact digital disc cleaner apparatus being generally referred to by the reference numeral 20. The compact digital disc cleaner apparatus 20 is illustrated in actual use in FIG. 1. The compact digital disc cleaner apparatus 20 includes a housing 22 having a top surface 24, also referred to as a first side, and a bottom surface 26, also referred to as a second side. As illustrated in FIG. 1, the top surface 24 refers to the surface of the compact digital disc cleaner apparatus 20 which is generally facing upwardly during use when the housing 22 is held in a user's hand 28. The top surface 24 includes a circular depression thereon forming a pedestal 30 configured for receipt of a compact digital disc 32. Positioned proximate oppositely facing sides of the pedestal 30 and interconnecting the pedestal 30 with an outer edge of the housing 22 are two recessed portions 34 which enable access to the edge of the compact digital disc 32 such that a user can readily grasp the edges of the compact digital disc 32 for removal and insertion thereof onto the pedestal 30. Positioned proximate the center of the pedestal 30 is a hub member 36, not unlike that typically found in a conventional compact digital disc case. The pedestal 30 is of such a diameter so as to receive a compact digital disc 32 and retain the compact digital disc 32 in a relatively stable condition during the cleaning process. Accordingly, the housing 22 of the present invention provides a covenient holder mechanism for holding the compact digital disc 32 during the cleaning process.

The bottom surface 26 of the compact digital disc cleaner apparatus 20 includes a plurality of cylindrical receptacles 40 aligned in rows and columns configured to receive corresponding cleaning pad assemblies 42. As illustrated in FIG. 5, the cleaning pad assemblies include a handle portion 44 and a cleaning pad portion 46. The handle portion 44 has an outside diameter nearly that of the inside diameter of the receptacle 40. Moreover, the handle portion 44 includes an annular tongue portion 43 which snaps into an annular groove portion 41 of the receptacle 40 such that a substantially airtight seal is created between the handle member 44 and the receptacle 40. In addition, the handle portion 44 includes a collar 48 which abuts against a top surface 50 of the receptacle 40 so as to raise a rim portion 52 above the top surface of the receptacle 40. Accordingly, the cleaning pad assembly 42 can be readily grasped proximate the rim portion 52 so as to enable removal from its associated receptacle 40. Additionally, the handle member 44 includes a top surface 54 forming an outwardly facing, concave surface 56.

The cleaning pad portion 46 is preferably made of a high absorbency, foam-like, soft, non-abrasive material. The cleaning pad 46 is pre-moistened or wetted with a conventional cleaning solvent chosen from any of a number of such solvents which are commercially available. The substantially airtight seal between the handle portion 44 and the receptacle 40 enables the wetted cleaning pad 46 to retain its moisture for a substantial period of time.

In the embodiment shown, positioned proximate the center of the second side 26 of the housing 22 is a cleaning brush assembly 60 removably positioned in a corresponding receptacle 62. The cleaning brush might include a foam brush for such purposes as pre-dusting or burnishing of the compact digital disc during the cleaning process.

In use, the compact digital disc 32 is positioned on the pedestal 30 and the housing 22 is grasped in the user's hand 28. A cleaning pad assembly 42 is removed from its associated receptacle 40 and wiped over the surface of the compact digital disc 32. The wetted cleaning pad 46 will cause the surface of the compact digital disc to be moistened so as to facilitate the cleaning process. It will be appreciated that a foam backing in back of a cleaning surface of the cleaning pad 46 might be used, such that the moisture will be retained largely in the foam backing until such time as the cleaning pad assembly is pressed against the surface of the compact digital disc 32, whereupon cleaning solvent will be transferred from the foam backing through the cleaning surface and onto the compact digital disc.

In the embodiment shown, indicia 27 is present on the handle member 44. For the cleaning pad assemblies 42 not used, the indicia 27 will have a predetermined alignment. Once a cleaning pad assembly 42 is used, it can be reinserted into its corresponding receptacle 40 such that indicia 27 on the used cleaning pad assembly 42 is not in alignment with the indicia 27 of the unused cleaning pad assemblies 42. Accordingly, by glancing at the bottom surface 26 of the housing 22, a user can tell if a particular cleaning pad assembly 42 has been used. It will be appreciated that other methods and structures might be utilized to indicate which cleaning pad assemblies have been used.

Figure 6:
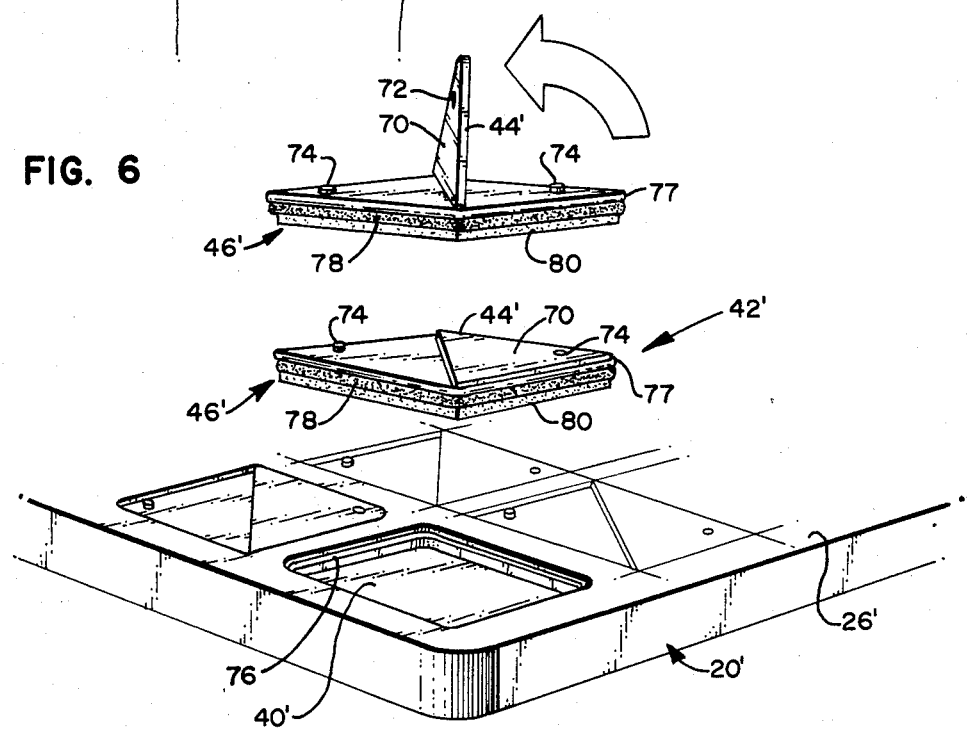
FIG. 6 is a partial, perspective view of a bottom surface of an alternate embodiment illustrating a cleaning pad assembly removed from its corresponding receptacle.

Illustrated in FIGS. 6 and 7 is an alternate embodiment of the present invention, corresponding parts being illustrated by prime reference numerals. Although not shown, the top surface of the compact digital disc cleaner apparatus 20' is substantially the same as that of the previous embodiment. The receptacles 40' in the bottom surface 26' are substantially rectangular in shape. The cleaning pad assembly 42' includes a handle portion 44' and a cleaning pad portion 46'. The handle portion 44' has a triangular portion 70 which can be flipped up, as illustrated in FIG. 6, to create a holding surface. In addition, the triangular member 70 might be color-coded, having different colors on each side thereof. Accordingly, by flipping the triangular member 70 one way or the other, the color showing will indicate whether the cleaning pad assembly 42' has been used or not. The triangular member 70 in the embodiment shown will include an aperture 72 configured to cooperate with cylindrical posts 74 positioned on the handle portion 44' so as to retain the triangular member 70 in position once folded down onto the cover portion 44'.

As illustrated in FIG. 7, the receptacle 40' might include a recessed collar portion (groove) 76 cooperating with an edge (tongue) 77 of the cover portion 44' so as to retain the cleaning pad assembly 42' in the receptacle 40' and provide a substantially airtight seal. The cleaning pad portion 46' might include a foam backing 78 of high absorbency and a cleaning surface 80 of less absorbency.

It is to be understood, however, that even though numerous characteristics and advantages of the invention have been set forth in the foregoing description, together with details of the structure and function of the invention, the disclosure is illustrative only and changes may be made in detail, especially in matters of shape, size and arrangement of parts, within the principles of the invention, to the full extent indicated by the broad general meaning of the terms in which the appended claims are expressed.

What is claimed is:

1. A compact digital disc cleaner apparatus for cleaning compact digital discs, comprising:

a housing having oppositely facing top and bottom surfaces, the top surface including pedestal means for positioning thereon a compact digital disc, the pedestal means defining circular recess means for receipt of the compact digital disc, second recess means interconnecting the circular recess means with an outer edge of the housing thereby facilitating grasping of the compact digital disc when positioned in the circular recess means, the bottom surface of the housing including a plurality of receptacle means, each configured for receipt of cleaning pad assembly means, the cleaning pad assembly means including a handle member and a wetted cleaning pad sealed from outside ambient air, whereby the cleaning pad does not dry out for an extended period of time.

2. A compact digital disc cleaner apparatus in accordance with claim 1, wherein the housing is substantially the size of a compact digital disc case.

3. A compact digital disc cleaner apparatus in accordance with claim 1, wherein the receptacle means are cylindrical, as are the cleaning pad assembly means, the receptacle means having an inside diameter and the handle member having an outside diameter cooperating to form a substantially airtight seal therebetween.

4. A compact digital disc cleaner apparatus in accordance with claim 3, wherein the handle member of the cleaning pad assembly means includes collar means for raising a rim portion of the handle member above a top surface of the receptacle means, whereby the rim portion can be grasped to enable removal of a cleaning pad assembly means from its associated receptacle.

5. A compact digital disc cleaner apparatus in accordance with claim 1, wherein the circular recess means includes a central hub portion like that found in a conventional compact digital disc case.

6. A compact digital disc cleaner apparatus in accordance with claim 1, wherein the cleaner apparatus further includes brush assembly means removably mounted on the bottom surface of the housing for brushing a surface of the compact digital disc whereby the compact digital disc can be burnished during the cleaning process and/or particulate removed prior to use of the cleaning pad assembly means.

7. A compact digital disc cleaner apparatus in accordance with claim 1, further including means for indicating if a cleaning pad assembly has previously been used.

8. A compact digital disc cleaner apparatus in accordance with claim 7, wherein the means for indicating if a cleaning pad assembly has previously been used includes indicia means visible when looking at the bottom surface of the compact digital disc cleaner apparatus.

9. A compact digital disc cleaner apparatus in accordance with claim 1, wherein the receptacle means and the cleaning pad assembly means include seal means for providing a substantially airtight seal between an inner surface of the receptacle means and an outer surface of the cleaning pad assembly means.

10. A compact digital disc cleaner apparatus in accordance with claim 9, wherein the seal means includes cooperating tongue and groove means.

11. A compact digital disc cleaner apparatus in accordance with claim 1, wherein the receptacle means and their corresponding cleaning pad assembly means are aligned in rows and columns.

12. A compact digital disc cleaner apparatus in accordance with claim 11, wherein there are eighteen of the receptacle means and their corresponding cleaning pad assembly means.

13. A compact digital disc cleaner apparatus for cleaning compact digital discs, comprising:

a housing having oppositely facing top and bottom surfaces, the top surface including pedestal means for positioning thereon a compact digital disc, the bottom surface of the housing including a plurality of cleaning pad assembly means for cleaning compact digital discs.

14. A compact digital disc cleaner apparatus in accordance with claim 13, wherein the pedestal means defines circular recess means for receipt of the compact digital disc and wherein the bottom surface of the housing includes a plurality of receptacle means configured for receipt of the cleaning pad assembly means, the cleaning pad assembly means including a handle member and a wetted cleaning pad sealed from outside ambient air, whereby the cleaning pad does not dry out for an extended period of time.

15. A compact digital disc cleaner apparatus in accordance with claim 13, wherein the housing is substantially the size of a compact digital disc case and wherein the cleaning pad assembly means are aligned in rows and columns, the compact digital disc cleaner apparatus further including means for indicating which of the cleaning pad assemblies have previously been used, as opposed to the cleaning pad assembly means which have not yet been used.

16. A compact digital disc cleaner apparatus for cleaning compact digital discs, comprising:

a housing having oppositely facing top and bottom surfaces, the top surface including pedestal means for positioning thereon a compact digital disc, the pedestal means defining circular recess means for receipt of the compact digital disc, the bottom surface of the housing including a plurality of receptacle means, each configured for receipt of cleaning pad assembly means, the cleaning pad assembly means including a handle member and a wetted cleaning pad sealed from outside ambient air, whereby the cleaning pad does not dry out for an extended period of time, the housing being substantially the size of a compact digital disc case, the receptacle means and the cleaning pad assembly means having cooperating cylindrical configurations whereby the cleaning pad assembly means can be removably positioned in the receptacle means, the compact digital disc cleaner apparatus further including means for indicating which of the cleaning pad assemblies have previously been used, as opposed to those which have not previously been used.

* * * * *